May 17, 1960
L. S. MICHELS
2,937,339
VARIABLE RANGE MARKING CIRCUIT WITH SIGNAL
MODULATION FOR DISPLAY IDENTIFICATION
Filed Feb. 21, 1955
2 Sheets-Sheet 1
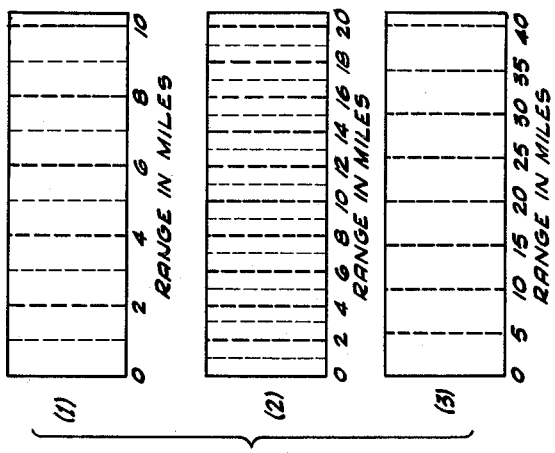
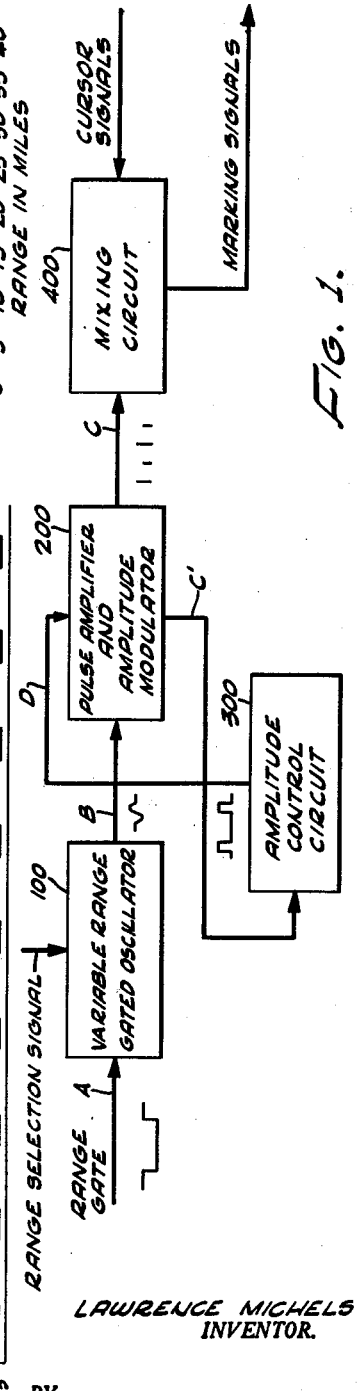
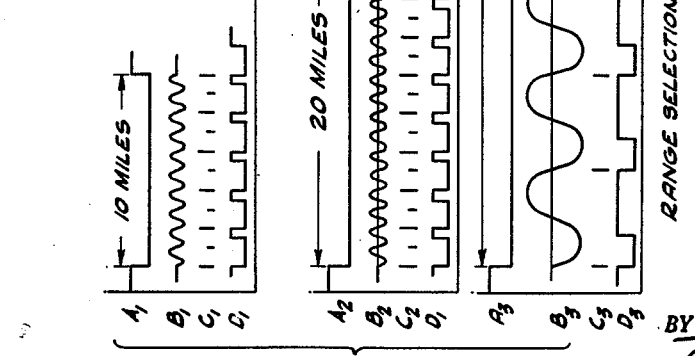
LAWRENCE MICHELS
INVENTOR.
BY
ATTORNEY

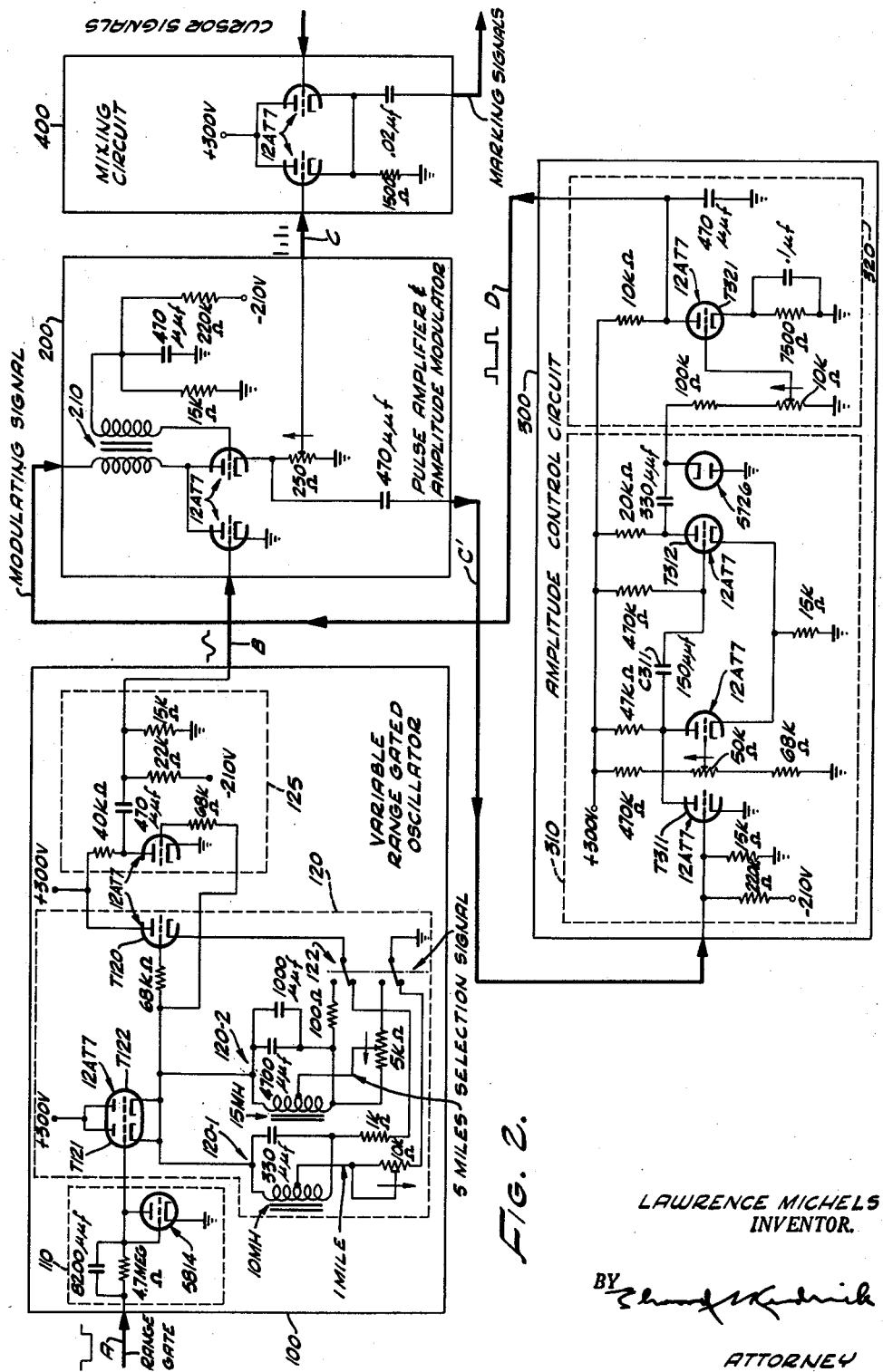

United States Patent Office 2,937,339
Patented May 17, 1960

2,937,339

VARIABLE RANGE MARKING CIRCUIT WITH SIGNAL MODULATION FOR DISPLAY IDENTIFICATION

Lawrence S. Michels, Inglewood, Calif., assignor to Gilfillan Bros. Inc., Los Angeles, Calif., a corporation of California Application February 21, 1955, Serial No. 489,360

10 Claims. (Cl. 328—189)

This invention relates to a variable range marking circuit with signal modulation for display identification and, more particularly, to a variable range marking circuit which may be utilized for providing a composite visual display for a radar or ground approach system where several range intervals may be made available through the same apparatus without confusion.

In many radar applications it is necessary to provide a variety of scanning ranges so that the precision of the display may be increased as the target nears the scanning location. Thus effectively the display is expanded as further detail is required in analyzing a nearing target.

In a typical situation then scanning ranges of 5, 10, 20 and 40 miles may be utilized. One manner of achieving this variety in scanning ranges is to provide two separate display devices which may be conveniently designated as short-range and long-range displays. The short-range display then is utilized for the 5 and 10 mile ranges and the long-range display for the 20 and 40 mile ranges.

The short-range displays provided in the conventional manner are readily distinguished since the number of range marks therein generally differs substantially. Thus, the conventional technique introduces no confusion since the short and long ranges appear upon different display devices and different displays in the same range have a considerable variation in the number of range marks. However, it is apparent that the conventional technique requires a certain duplication in apparatus since two display devices must be provided to cover the short and long ranges.

Moreover, the standard technique generally requires three types of range marking circuits for generating 1, 2 and 5 mile markers. The 1 and 2 mile markers may be utilized for the short range displays and the 5 mile markers for the long range displays.

Where economy is of the essence, the conventional technique is not suitable since it becomes desirable to utilize a single display for both short and long ranges. In this situation, then, the standard technique becomes confusing whenever the number of markers occurring in the entire display is the same. Thus a 20 mile display with 2 mile markers would appear identical to a 10 mile display with 1 mile markers.

Furthermore, it is desirable to minimize the number of range marking circuits required so that only two such circuits need be utilized such as a units marking circuit, or one mile marker, and a multiple units marking circuit such as a 5 mile marker.

The present invention solves this problem in an efficient manner and obviates the necessity for providing separate displays for short and long ranges to avoid confusion. Furthermore, the same means which introduces a distinguishing characteristic between the short and long range displays also provides additional marking signals without separate range marking circuits.

According to the present invention the short range, or precision scales, include range markers of varying intensities, the signals being derived through a "count-down" modulator circuit which receives marking signals and modulates such signals in amplitude in accordance with a predetermined count-down function. Thus, in a simple arrangement, a count-down of 2 may be performed so that successive range marks in the short range scale appear alternately in varying intensity. In this situation, then, a short range scale of 5 or 10 miles includes intensified marks at even intervals of miles such as 0, 2, 4, etc., and reduced intensity marks at odd intervals of miles.

The long range scales then include a fewer number of, or no variations in intensity and may, for example, include only 5 mile markers without any variation. In this manner, then, the utilization of the same display device to provide short range scales of 5 and 10 miles and long range scales of 20 and 40 miles causes no confusion since the short range scales are readily identified through the varying intensity of the markers. Moreover, the alternate variation of marker intensity effectively serves as a double range marking system so that, in the case discussed above, a single 1 mile marker provides both 1 and 2 mile marking signals.

In this manner a single display may be utilized to provide a plurality of scales and only two range marking circuits are required. The invention may be extended, of course, to utilizations where the "count-down" operation is more complicated. For example, three different ranges may be provided on the same display where the shortest range includes three gradations of intensity in the range marking signals, the varying modulation being achieved through a scale-of-3 count; the intermediate range display may include two gradations in intensity achieved through a scale-of-2 count-down operation, and the maximum range scale may have no variations in intensity.

Accordingly, it is an object of the present invention to provide a variable range marking circuit which may be utilized to provide a plurality of range displays without confusion.

Another object of the invention is to provide a range marking circuit with signal modulation for display identification where short and long range displays may be shown on the same device without resulting in confusion where the number of range marks is the same for different displays.

A further object of the invention is to provide a variable range marking circuit wherein only a units and multiple units marking circuit is required, the units marking being "count-down" modulated to provide variation in amplitude between successive marks.

Yet another object of the invention is to provide a circuit allowing a variety of scanning range displays of varying precision with a minimum of circuits and without confusion between displays.

Still another object of the invention is to provide an economical range marking circuit wherein display identification is achieved by "count-down" modulating certain marks to distinguish displays.

A specific object of the invention is to provide a range marking circuit wherein variable range marking signals are passed through a pulse generator wherein certain marking signals are modulated in amplitude to provide an effective additional variation in markers as well as a convenient manner of display identification.

The novel features which are believed to be characteristic of the invention, both as to its organization and method of operation, together with further objects and advantages thereof, will be better understood from the following description considered in connection with the accompanying drawings. It is to be expressly understood, however, that the drawings are for the purpose of illustration and description only, and are not intended as a definition of the limits of the invention.

Fig. 1 is a block diagram of one form of variable range marking circuit with signal modulation for display identification according to the present invention;

Fig. 1a is a composite set of waveforms of various signals which appear in the embodiment of Fig. 1 in a typical operation;

Fig. 1b shows the general appearance of the display of the marking pulses of Fig. 1a for respective scales; and Fig. 2 is a schematic diagram of a specific circuit arrangement which may be utilized in the embodiment of Fig. 1.

Reference is now made to Fig. 1 wherein there is shown a circuit for producing range marking pulses suitable for display through the same means, without confusion between displays representing different scales. As shown in Fig. 1, the circuit comprises a variable range gated oscillator 100 which receives a range gate signal A and produces output signal B at a repetition rate corresponding to the interval between range marking signals desired.

Signals thus produced by oscillator 100 are applied to a pulse amplifier and amplitude modulator stage 200 which produces modulated output signals C having amplitudes controlled in accordance with a signal D, produced by an amplitude control circuit 300. Control circuit 300 receives a signal C' for each occurrence of a signal C and then is operative to count down between successive signals C' by a predetermined amount to produce an amplitude control signal specifying a predetermined arrangement of intensity gradations among signals C. It will be understood that signals C' may be the same as signals C or B or any other signals indicating the time of occurrence of signals C.

The embodiment of Fig. 1 also includes a mixing circuit 400 which receives signals C and other signals such as cursor signals and produces a composite set of marking output signals. It will be understood, however, that circuit 400 does not form an essential part of the invention.

The basic principles of the invention may be better understood by considering a typical operation such as is depicted in Figs. 1a and 1b. In these figures three range scales are to be marked, provision being made so that the marking of the scales may be achieved through the same display arrangement. In the particular illustration, the scales of 10, 20 and 40 miles have been selected, the 10 and 20 mile scales including 1 and 2 mile markers and the 40 mile scale including 5 mile markers.

The waveform notation utilized in Fig. 1a has been selected to allow the utilization of the same letters A, B, C and D to represent the same waveform for each of the three situations, a subscript 1, 2 or 3 being utilized to indicate the 10, 20 and 40 mile scale representations, respectively. Thus the waveforms $A_1$, $B_1$, $C_1$ and $D_1$ represent: the range gate signals A; the oscillator signals B; the pulses C; and the control signals D, during the 10 mile scale marking operation.

Referring to Fig. 1a then it will be noted that in the assumed illustrative case oscillator 100 is variable between two types of markers. The first marker may be considered to be a units marker, or 1 mile marker, and the second marker a multiple units marker, or 5 mile marker. Thus in the 10 and 20 mile scales the oscillator is actuated in accordance with a range selection signal, which may be achieved through a mechanical switching action, to produce units marking signals; and during the 40 mile scale operation oscillator 100 produces signals B marking 5 mile intervals.

Although a multitude of different types of control signals D may be utilized to specify distinguishing amplitude characteristics in signal C it is assumed, as an illustration, that signal D is a two level signal. This signal has a relatively high level prior to the receipt by circuit 300 of circuit C' and thereafter has a lowered level for a period which is assumed as an illustration to be somewhat greater than a 1 mile marking period, but less than a 2 mile marking period.

The amplitude of signal D then controls the amplitude of signal C so that in the case of the 10 and 20 mile scales signals C marking even mile intervals 0, 2, 4, etc., assume a relatively large amplitude providing a corresponding intensified range mark on the respective display of Fig. 1b; and odd mile marking signals C, in these displays, assume a lower amplitude corresponding to the lower amplitude of control signal D, and the mark in the respective display of Fig. 1b appears at a lower intensity.

At this point it may be noted that the display arrangement of Fig. 1b is not intended to represent a particular type of radar presentation such as a "B" or "P.P.I." display. The important thing to note is the simple manner in which various range signals may be distinguished and that effectively additional range marking signals are achieved due to the differing intensity between marks, without the necessity of additional range-gated oscillator means. It should further be understood that the waveforms of Fig. 1a represent only a single range-gated interval. Consequently, in a typical application such as the utilization of the invention to provide a B display, the signals provided represent only a series of horizontal dots at respective range intervals, the dots being modulated in intensity in accordance with the preselected modulation function.

The other important thing to note in this general description is that the amplitude control circuit 300 does not function to modulate any of the 5 mile markers in the 40 mile scale since the count down function has been selected so that control signal returns to its relatively high amplitude following the receipt of a signal C' before the end of a 2 mile marking period thereafter. Thus the 40 mile scale could include 2, 3 or 4 mile markers in place of the 5 mile marking signals and the 40 mile scale still would be readily distinguishable from either the 10 or 20 mile scales in that the variation in marking intensity is absent therein.

Thus one utilizing this display arrangement may switch to any of the range scales and may easily detect the difference therebetween due to the variation in display gradations between short and long range scales, and due to the substantial difference in numbers of range marks in range scales of the same order. Further, it will be noted that the signal modulation approach provides a convenient manner of effectively introducing additional markers without the necessity of additional range-gated oscillators or additional circuitry to provide further selections in the oscillator already available.

A specific circuit arrangement for practicing the invention is shown in Fig. 2 where particular values of circuit elements which may be employed are indicated. While the circuit arrangement shown is preferred for providing range marks alternating in intensity, every other mile, it will be understood that other arrangements may be preferred if different types of signal modulation are desired for display identification.

Referring now to Fig. 2, it is noted that variable range gated oscillator 100 includes an input clamping stage 110 having a triode type 5814 connected as a diode so as to prevent the input signal applied to oscillator stage 120, which follows, from exceeding ground potential.

Oscillator stage 120 may be considered to be a conventional Hartley oscillator including two tuned circuits 120-1 and 120-2 tuned to provide 1 and 5 mile range marking signals respectively. The conventional Hartley feedback circuit between the center tap coil and the cathode of the oscillator stage is achieved through a double-pole-double-throw switch 122 which connects the selected tuned circuit to the cathode of tube T120, a suitable tube being indicated as a one-half section of type 12AT7. Tuned circuit 120-1 or 120-2 is gated in response to range gate signal A applied to stages T121 and T122, which normally suppress any oscillation therein until receipt of signal A.

The marking signals produced by oscillator 120 are then amplified in a stage 125 and applied to pulse amplifier and amplitude modulator 200. Stage 200, it will be noted, is shown as a conventional blocking oscillator where the anode winding of pulse transformer 210 receives its potential from amplitude control circuit 300 in the form of signal D. Thus the amplitude of the signals produced by blocking oscillator 200 is controlled by the level of the signal provided by stage 300.

While control circuit 300 may assume a multitude of different forms, depending upon the type of modulation desired, it is shown in a convenient arrangement as including a single stable state multivibrator stage 310 and an output amplifier stage 320. The important thing to be noted is that the time constants of stage 310 are selected so that the time required for the return of stage 310 to its initial stable state after receipt of a signal C' from stage 200 is selected to exceed the time between units or 1 mile marking signals provided by oscillator 120, but is less than a 2 mile marking interval.

The operation of stage 310 may be better understood in terms of the specific operation of certain circuit elements therein. For this purpose assume that stage 310 is unactuated until a signal C' is received. The receipt of a signal C' causes a negative signal to be developed by input tube T311, which passes through capacitor C311 and cuts off tube T312, causing an increased amplitude signal to be applied to tube T321 in amplifier 320. Amplifier 320 then produces a reduced level output signal in response thereto, the duration of which corresponds to the length of the unstable state period of multivibrator 310.

As is well known, the length of the unstable state of a multivibrator such as stage 310 depends upon the time required for capacitor C311 to discharge sufficiently so that tube T312 may again conduct, returning the amplitude control signal D again to a high level.

In operation then multivibrator stage 310 is triggered to a state controlling the production of a control signal D of decreased amplitude in response to alternate signals C'. Once having been triggered to its unstable state, multivibrator 310 is then not responsive to the following signal C' and returns to its initial state after a time specified by the circuit constants as discussed above.

Essentially, the arrangement shown is a circuit providing a count-down function of 2 where the multivibrator counts in a binary fashion and controls the modulation in amplitude of every other marking signal. However, it may be convenient to utilize other count-down functions, as for example may be achieved through a ternary counter. This operation may be achieved through an integrating counting circuit such as may employ capacitors for energy storage, typical arrangements being found in United States Patent No. 2,619,618 for "Energy Storage Counter" by Bernard Adler issued November 25, 1952; and United States Patent No. 2,686,008 for "Counting and Scaling Circuits" by William C. Davidon issued August 10, 1954.

It will be noted that a mixing circuit 400 is shown, although it does not form an essential part of the invention. This circuit may be utilized to combine the modulated range marking signals provided by the present invention with other signals such as cursor signals provided through other means.

From the foregoing description it is apparent that the present invention provides an efficient means for generating marking signals having variations in modulation for display identification. According to the basic concept of the invention signals such as C' are effectively counted and corresponding marking signals are modulated according to a predetermined identification function so that signals representing a plurality of different ranges may be utilized to control the same display without confusion.

A specific circuit arrangement has been shown in order to illustrate a simple technique for display identification where a count-down operation in the scale of 2 is specified. However, it should be apparent that a multitude of other modulation functions may be employed without departing from the spirit of the invention. Furthermore, it will be understood that the particular type of range gated oscillator which is shown, pulse amplifier and amplitude modulator, or amplitude control circuit, is not a critical factor in the practice of the invention.

I claim:

1. In a system for scanning a plurality of different range intervals in order to locate targets therein, the system including means for displaying target-representing signals indicating the position of the target in the corresponding range interval; a signal generator for producing modulated marking pulses representing range marks in a selected range interval, the modulation of the pulses being selected to distinguish the displays of different range intervals, said signal generator comprising: means for producing marking pulses selectively representing either units or multiple units range marks; means responsive to said marking pulses for producing a modulating control signal having at least two signal levels where the difference in the signal levels corresponds to difference in intensity desired between said modulated pulses, said second means including a device for maintaining one of said signal levels for a predetermined period coextensive with the occurrence of a predetermined number of units marking pulses; and third means responsive to said marking pulses and to said modulating control signals for producing the modulated range marking pulses where the variation in intensity between successive signals is specified by said modulation control signal.

2. The generator defined in claim 1 wherein said third means includes a count down circuit for producing a modulation control signal at a frequency which is reduced from the frequency of repetition of the units range pulses by a predetermined amount.

3. The generator defined in claim 2 wherein said predetermined amount is selected so that alternate units marks are intensified but successive multiple units marks are not intensified.

4. A device for producing range-marking pulses suitable for display through the same means without confusion between displays representing different range scales, said device comprising: a variable frequency oscillator actuable to produce first output signals having a repetition rate representing a range increment; an amplifier for receiving said first output signals and producing modulated second output signals having respective amplitudes determined by the amplitude of a received modulation control signal; and an amplitude control circuit coupled to said amplifier and responsive to said second output signals for producing the modulation control signal in accordance with a predetermined count-down function distinguishing the various range scales, said amplifier being a blocking oscillator circuit including a pulse transformer having primary and secondary windings and an electron discharge device having an anode coupled to one end of said primary winding; said amplitude control signal being applied to the other end of said primary winding.

5. A device for producing range-marking pulses suitable for display through the same means without confusion between displays representing different range scales, said device comprising: a variable frequency oscillator actuable to produce first output signals having a repetition rate representing a range increment; an amplifier for receiving said first output signals and producing modulated second output signals having respective amplitudes determined by the amplitudes of a received modulation control signal; and an amplitude control circuit coupled to said amplifier and responsive to said second output signals for producing the modulation control signal in accordance with a predetermined count-down function distinguishing the various range scales, said amplitude control circuit including a single state multivibrator having a return time constant selected to count-down from the repetition rate of the selected frequency of said variable frequency oscillator source to present a predetermined selected scale.

6. A device for producing range-marking pulses suitable for display through the same means without confusion between displays representing different range scales, said device comprising: a variable frequency oscillator actuable to produce first output signals having a repetition rate representing a range increment; an amplifier for receiving said first output signals and producing modulated second output signals having respective amplitudes determined by the amplitude of a received modulation control signal; and an amplitude control circuit coupled to said amplifier and responsive to said second output signals for producing the modulation control signal in accordance with a predetermined count-down function distinguishing the various range scales, said variable frequency oscillator producing at least two series of fixed output signals representing one and five mile range markers, respectively, said amplitude control circuit including means for producing a control signal specifying a reduced amplitude for alternate second output signals representing one-mile markers, whereby short-range display such as five or ten mile scales include one-mile markers of alternate gradations and long-range scales such as twenty or forty miles, including only five-mile markers.

7. A device for selectively generating at least two different sets of marking pulses for an indicator to produce visual representations thereon of scales which differ considerably in appearance, said device comprising: a source for periodically producing output pulses at least at two substantially constant, but different repetition frequencies; and modulation means responsive to an output signal of said source of only one of said two frequencies for changing the amplitude of at least every $n$th one of said output pulses to be the same amplitude as each successive $n$th output pulse, but to be different from the amplitude of at least one other of said output pulses in each successive group of $n$ pulses, where $n$ is any positive integer larger than unity.

8. A device for selectively generating at least two different sets of marking pulses for an indicator to produce visual representations thereon of scales which differ considerably in appearance, said device comprising: a source for producing alternating output signals at least at two substantially constant, but different frequencies; modulation means responsive to said alternating output signals for generating output pulses at two different repetition rates corresponding to said two frequencies, respectively; and amplitude control means responsive to only one of said two alternating output signals for changing the amplitude of at least every $n$th one of said output pulses to be the same amplitude as each successive $n$th output pulse, but to be different from the amplitude of at least one other output pulse in each successive group of $n$ pulses, where $n$ is any positive integer larger than unity.

9. A device for selectively generating at least two different sets of marking pulses for an indicator to produce visual representations thereon of scales which differ considerably in appearance, said device comprising: a source for producing alternating output signals at least at two substantially constant, but different frequencies; modulation means responsive to said alternating output signals for generating output pulses at two different repetition rates corresponding to said two frequencies, respectively; and amplitude control means responsive to only one of said two alternating output signals for changing the amplitude of at least every $n$th one of said output pulses to be the same amplitude as each successive $n$th output pulse, but to be different from the amplitude of at least one other output pulse in each successive group of $n$ pulses, where $n$ is any positive integer larger than unity, said amplitude control means being inoperative to amplitude modulate output pulses having a repetition rate corresponding to the other of said frequencies.

10. A device for selectively generating at least two different sets of marking pulses for an indicator to produce visual representations thereon of scales which differ considerably in appearance, said device comprising: a source for producing a first alternating output signal of a substantially higher frequency and a second alternating output signal of a substantially constant lower frequency; modulation means responsive to said alternating output signals for generating output pulses at higher and lower repetition rates corresponding to said higher and lower frequencies, respectively; and an amplitude control circuit including a monostable multivibrator having a time constant greater than the reciprocal of said higher repetition rate and less than the reciprocal of said lower repetition rate, said amplitude control means being responsive only to said first and other alternating output signals having frequencies greater than the reciprocal of said multivibrator time constant for changing the amplitude of at least every $n$th one of said marker pulses to be the same amplitude as each successive $n$th output pulse, but to be different from the amplitude of at least one other in each successive group of $n$ pulses, where $n$ is any positive integer larger than unity.

References Cited in the file of this patent

UNITED STATES PATENTS

| | | |
|---|---|---|
| 2,425,330 | Kenyon | Aug. 12, 1947 |
| 2,564,006 | Haworth | Aug. 14, 1951 |
| 2,680,210 | Miller et al. | June 1, 1954 |
| 2,693,500 | Cooper | Nov. 2, 1954 |

UNITED STATES PATENT OFFICE
CERTIFICATE OF CORRECTION

Patent No. 2,937,339                                      May 17, 1960

Lawrence S. Michels

It is hereby certified that error appears in the printed specification of the above numbered patent requiring correction and that the said Letters Patent should read as corrected below.

Column 1, line 39, after "devices" insert a comma; column 3, line 75, for "circuit" read -- signal --; column 8, line 31, before "higher" insert -- constant --.

Signed and sealed this 4th day of April 1961.

(SEAL)
Attest: ERNEST W. SWIDER

Attesting Officer

ARTHUR W. CROCKER
                                                          Acting Commissioner of Patents